(No Model.)

W. I. LINDSAY.
CAR WHEEL.

No. 284,448. Patented Sept. 4, 1883.

Attest:
Wm H Row
H. N. Jenkins

Inventor:
William I Lindsay
By Armat Stoddart
atty (No Model.)

W. I. LINDSAY.
CAR WHEEL.

No. 284,448.  Patented Sept. 4, 1883.

2 Sheets—Sheet 2.

Attest.
W. H. Rowe
H. N. Jenkins

Inventor:
William I. Lindsay
By Armat Goodart
atty.

UNITED STATES PATENT OFFICE.

WILLIAM I. LINDSAY, OF CLEVELAND, OHIO.

CAR-WHEEL.

SPECIFICATION forming part of Letters Patent No. 284,448, dated September 4, 1883.

Application filed January 22, 1883. (No model.)

*To all whom it may concern:*

Be it known that I, WILLIAM ISAIAH LINDSAY, of Cleveland, county of Cuyahoga, State of Ohio, have invented certain new and useful Improvements in Car-Wheels, of which the following is a full and exact description, reference being had to the accompanying drawings, making part of this specification.

My invention relates to that class of car-wheels in which a steel or other hard-metal tire is held in place upon a central body by means of flanges upon the one that interlocks with corresponding recesses upon the other, and by bolts connecting the parts in such manner that the tire and body of the wheel may be readily united or separated one from the other.

The object of my invention is to make a simple, strong, and durable union between the body and tire of the wheel by means of the peculiar form of the interlocking surfaces, to connect these parts more securely by screw-bolts passing through flanges and brackets upon the hub and into the solid portion of the tire, and, further, to provide a simple device to prevent the bolts from becoming accidentally displaced.

Figure 1:
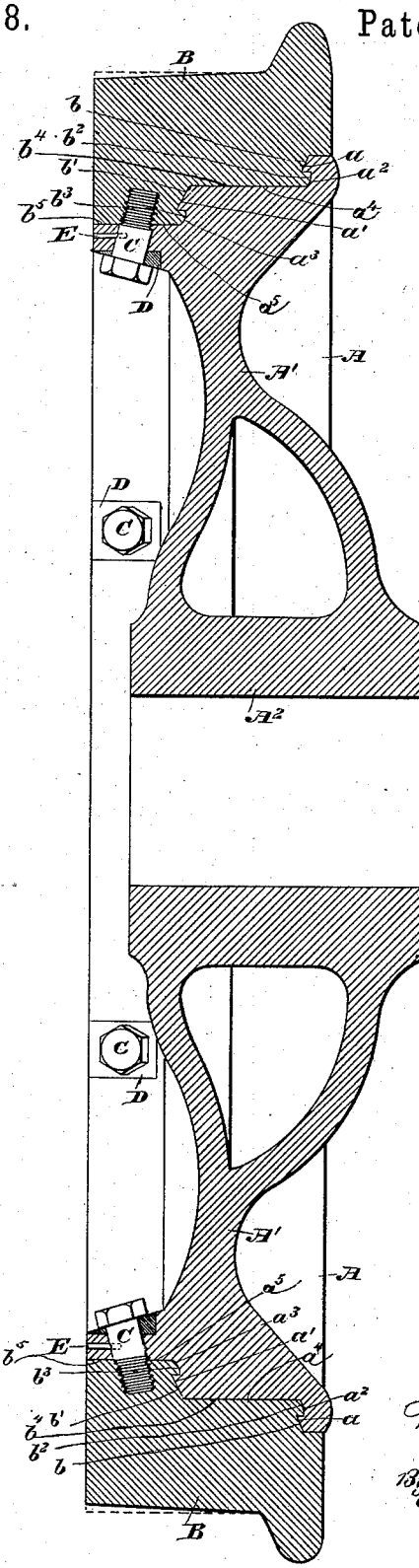
Figure 2:
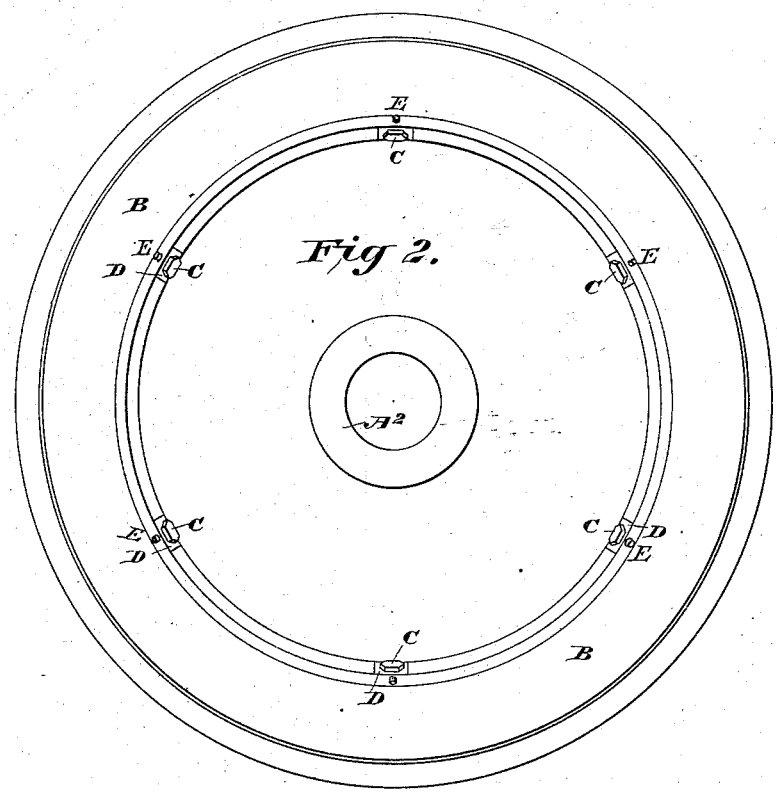

In the accompanying drawings, Figure 1 is a cross-section of a car-wheel, showing all of the improved parts; Fig. 2, a side view of the same; and Fig. 3, a cross-section in detail through the tire and periphery of the body of the wheel, showing a modification of the shape of the interlocking surfaces.

The body A of the wheel is cast with web A' and hub $A^2$, of any desired form, the web A' being solid, ribbed, or, as shown in the drawings, may be hollowed at $A^3$ in a well-known manner to secure lightness and strength. The periphery of the body is peculiarly formed with steps $a$ $a'$, the one forming a rim upon its outer edge and the other upon the middle of its transverse section. These steps have grooves or indentations $a^2$ $a^3$ at their bases, to receive ribs formed upon the inner surface of the tire and interlock the parts one with the other.

Figure 3:
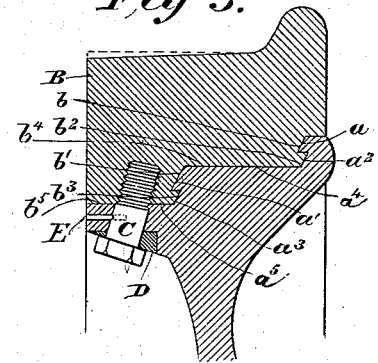

The tire B is preferably of steel, and may be rolled in the desired shape without difficulty. The tread and outer surfaces of the tire may be of the usual form; but the inner surface is rolled with steps $b$ $b'$ and ribs $b^2$ $b^3$, to conform to and interlock with the steps $a$ $a'$ and indentations $a^2$ $a^3$ on the periphery of the body of the wheel. The inner surfaces, $a^4$ and $a^5$, of the tire and the outer surfaces, $b^4$ $b^5$, of the body of the wheel may be either cylindrical or slightly coned from the outer to the inner sides of the wheel, in order that the tire may be readily slipped upon the body of the wheel and the two parts interlock without the expansion of the tire. The risers or faces $a$ $a'$ of the steps are inclined in parallel planes, and the indentations $a^2$ $a^3$ of the body and ribs $b^2 b^3$ of the tire may be either square or rounded, as shown in Fig. 1, or inclined to form a saw-tooth-shaped cross-section, as shown in Fig. 3. This interlocking device will effectually prevent the tire from spreading by the crushing strain and centrifugal force of a heavily-loaded and rapidly-revolving wheel, and serve to bind the parts at all times closely together. The tire is held from lateral displacement upon the body of the wheel, and firmly secured thereto by screw-bolts C, which pass outwardly through the inner rim of the body of the wheel, and screw into the inner rim of the tire in an inclined direction parallel with the faces $a$ $a'$ $b$ $b'$ of the risers upon the periphery of the wheel-body, and by being thus inclined will penetrate the tire toward the middle or solid portion of the body of the tire, and tend to keep the inclined faces of the interlocking surfaces pressed closely together, and also hold the parts firmly should the tire be broken in one or more places. Any required number of bolts may be employed, and a corresponding number of brackets, D, are formed upon or secured to the inner surface of the inner flange of the wheel-body, to give additional strength to that part of the flange, and, having a flat inclined surface at right angles to the axis of the bolt, provide an even bearing or seat for the head of the bolt. The bolt passes through a smooth bore in the bracket D and rim of the wheel-body, so that undue strain does not come upon the threads of the bolt. A hole is drilled through the face of the inner flange of the wheel-body, and also into the bolt C when it has been screwed firmly into place, and a soft-metal pin, E, preferably made of the best soft copper wire of proper size, a little shorter than the depth of the hole, is inserted therein, and is upset while in the hole by means of a steel pin or drift to prevent its accidental displacement. This pin will prevent the bolt from turning unless great force is used with a bolt-wrench, or sufficient to break the pin, when the bolt can be removed. The interlocking steps upon the middle portion as well as upon the rim of the wheel give great additional binding force, while the inclined bolt that passes radially through the flange of the wheel into the body of the tire gives increased strength without material diminution of the bearing-surfaces of the tire and the body of the wheel.

I do not claim, broadly, a car-wheel center and tire united by interlocking steps and bolts, as various devices of this description have been heretofore employed; but,

Having now described my invention, I claim—

1. In a car-wheel, the body and tire formed with the inclined interlocking or saw-toothed tongue-and-grooved steps upon the outer and middle portions of their bearing-surfaces, in combination with the screw-bolts passing through the body into the tire at a point near the outer edge of the tread of the wheel, whereby three points of connection are made between the body and tire, substantially as and for the purpose set forth.

2. The combination of the car-wheel body A, the tire B, the interlocking inclined faces of the steps $a\ a'\ b\ b'$, the correspondingly-inclined screw-bolt C, and the bracket D, formed with an inclined face at right angles to the axis of the screw-bolt, substantially as and for the purpose described.

3. The combination of the car-wheel body A, the tire B, the screw-bolt C, and soft-metal pin E, constructed and arranged substantially as and for the purpose set forth.

WILLIAM I. LINDSAY.

Witnesses:
CHAS. H. GILL,
H. E. MORRISON.